(12) United States Patent
Hegewald et al.

(10) Patent No.: US 10,611,288 B2
(45) Date of Patent: Apr. 7, 2020

(54) TRANSPORT VEHICLE FOR CONTAINERS (71) Applicant: Konecranes Global Corporation, Hyvinkää (FI)

(72) Inventors: Mike Hegewald, Düsseldorf (DE); Jannis Moutsokapas, Monheim (DE)

(73) Assignee: Konecranes Global Corporation, Hyvinkää (FI)

( * ) Notice: Subject to any disclaimer, the term of this patent is extended or adjusted under 35 U.S.C. 154(b) by 85 days.

(21) Appl. No.: 16/062,341

(22) PCT Filed: Dec. 14, 2016

(86) PCT No.: PCT/EP2016/081041
§ 371 (c)(1),
(2) Date: Jun. 14, 2018

(87) PCT Pub. No.: WO2017/102865
PCT Pub. Date: Jun. 22, 2017

(65) Prior Publication Data
US 2018/0370410 A1 Dec. 27, 2018

(30) Foreign Application Priority Data
Dec. 15, 2015 (DE) .......................... 10 2015 121 846

(51) Int. Cl.
*B60P 7/18* (2006.01)
*B60P 1/64* (2006.01)
(Continued)

(52) U.S. Cl.
CPC .............. *B60P 1/6445* (2013.01); *B60P 1/02* (2013.01); *B60P 1/649* (2013.01); *B60P 1/6481* (2013.01);
(Continued)

(58) Field of Classification Search
CPC ........... B60P 1/6445; B60P 7/18; B60P 1/649; B60P 1/6481; B60P 7/13; B60P 1/02; B62D 33/04
(Continued)

(56) References Cited

U.S. PATENT DOCUMENTS 3,606,842 A * 9/1971 Verbick ..................... B60P 7/10
410/94
5,017,066 A 5/1991 Tylisz
(Continued)

FOREIGN PATENT DOCUMENTS

CN   1780748 A   5/2006
CN   101033035 A  9/2007
(Continued)

OTHER PUBLICATIONS

International Search Report of the International Searching Authority from corresponding Patent Cooperation Treaty (PCT) Application No. PCT/EP2016/081041, indicated completed on Jun. 1, 2017.
(Continued)

*Primary Examiner* — Stephen T Gordon
(74) *Attorney, Agent, or Firm* — Gardner, Linn, Burkhart & Ondersma LLP (57) ABSTRACT

A transport vehicle includes a first support surface and two opposite guiding surfaces that are oriented towards each other to guide a container that is placed onto the transport vehicle in the direction of the first support surface, with the first support surface located between the guiding surfaces, and with a lifting platform arranged between the guiding surfaces. An adapter that is movable between a standby and an operating position such that a container placed onto the vehicle is guided onto the first support surface when the adapter is in the standby position and the lifting platform is down in a transporting position, while the container is
(Continued)

guided onto a second support surface formed by the lifting platform when the adapter is placed on the transport vehicle in the operating position of the adapter and when the lifting platform is placed on the transport vehicle via the adapter.

20 Claims, 4 Drawing Sheets

(51) Int. Cl.
*B60P 1/02* (2006.01)
*B62D 33/04* (2006.01)
*B60P 7/13* (2006.01)

(52) U.S. Cl.
CPC .................. *B60P 7/13* (2013.01); *B60P 7/18* (2013.01); *B62D 33/04* (2013.01)

(58) Field of Classification Search
USPC .................................. 410/52, 72, 80, 94, 95
See application file for complete search history.

(56) References Cited

U.S. PATENT DOCUMENTS

| | | | |
|---|---|---|---|
| 5,785,473 A * | 7/1998 | Stark | B60P 7/0892 410/69 |
| 6,206,127 B1 | 3/2001 | Zakula, Sr. et al. | |
| 6,557,658 B1 | 5/2003 | Enmeiji et al. | |
| 7,350,840 B2 | 4/2008 | Franzen et al. | |
| 8,128,064 B2 | 3/2012 | Franzen et al. | |
| 8,157,492 B2 | 4/2012 | Franzen et al. | |
| 8,651,793 B2 | 2/2014 | Franzen et al. | |
| 8,789,635 B2 | 7/2014 | Franzen et al. | |
| 9,522,623 B2 | 12/2016 | Franzen et al. | |
| 9,701,518 B2 | 7/2017 | Rosenstrom et al. | |
| 2001/0038777 A1 | 11/2001 | Cassell | |
| 2014/0017045 A1 | 1/2014 | Wieschemann et al. | |
| 2014/0017046 A1 | 1/2014 | Wieschemann et al. | |
| 2016/0362033 A1 | 12/2016 | Hegewald et al. | |
| 2017/0182923 A1 | 6/2017 | Hegewald | |

FOREIGN PATENT DOCUMENTS

| | | |
|---|---|---|
| DE | 102007039778 A1 | 2/2009 |
| DE | 102009025051 A1 | 12/2010 |
| DE | 102013114841 A1 | 6/2015 |
| GB | 1464383 A | 2/1977 |

OTHER PUBLICATIONS

Written Opinion of the International Searching Authority from corresponding Patent Cooperation Treaty (PCT) Application No. PCT/EP2016/081041, indicated completed on Jun. 1, 2017.
Preliminary Report on Patentability of the International Searching Authority in English from corresponding Patent Cooperation Treaty (PCT) Application No. PCT/EP2016/081041, completed Jun. 19, 2018.
Commonly assigned co-pending U.S. Appl. No. 15/755,727, filed Feb. 27, 2018, entitled Heavy-Duty Lift Truck.
Commonly assigned co-pending U.S. Appl. No. 15/773,116, filed May 2, 2018, entitled Transport Vehicle for Containers, Comprising a Battery Module for Supplying the Drive Unit.
Commonly assigned co-pending U.S. Appl. No. 16/062,317, filed Jun. 14, 2018, entitled Transport Vehicle For Containers.

* cited by examiner

Fig. 1

TRANSPORT VEHICLE FOR CONTAINERS

CROSS REFERENCE TO RELATED APPLICATIONS

The present application claims the priority benefits of International Patent application No. PCT/EP2016/081041, filed Dec. 14, 2016, and claims benefit of German patent application DE 10 2015 121 846.1, filed Dec. 15, 2015.

BACKGROUND OF THE INVENTION

The invention relates to a transport vehicle for containers, having a first set-down surface on which a container can be set down, and having two manually operating guide surfaces which extend towards one another in the direction of the first set-down surface in order to guide a container during set-down on the transport vehicle in the direction of the first set-down surface, wherein the first set-down surface is disposed between the guide surfaces and wherein a lifting platform which can be raised and lowered is disposed between the guide surfaces.

Typical areas of application of such transport includes are loading and unloading plants for containers and in this connection in particular the transport of containers within container terminals in sea ports or inlaid ports and in container terminals for continued traffic between road and rail.

In this context, containers are understood to be ISO containers in the sense of large-capacity or sea freight containers with standardised pick-up points or corner fittings for load picking-up means which are used in the international transportation of goods. the most widely used are ISO containers with a standard width of 8 feet or 2438 mm and a length of 20, 40 or 45 feet.

Furthermore, containers also designated as pallet-wide or wide-body containers should also be included, having a width of more than 2438 mm, in particular of about 2500 to 2550 mm but otherwise having the stated lengths and standardised corner fittings of ISO containers.

A corresponding transport vehicle is arranged for a payload of at least 20 t and is accordingly designed as a heavy-duty transport vehicle. Said containers can weigh up to 45 t in the loaded condition. A transport vehicle which travels empty or transports an empty container should also be understood in this way provided that this vehicle can transport a payload of at least 20 t.

Such transport vehicles usually comprise wheels with tires, e.g. air-filled rubber tires, and are also floor-bound but not rail-bound and can therefore travel freely. Accordingly, the transport vehicles in the present case are to be distinguished from rail vehicles and in particular railway wagons. Furthermore, the transport vehicles can be operated manually via an accompanying driver in the driver's cabin, in a semi-automated manner or—in the case of so-called automated guided vehicles (AGVs) which do not have to have a driver's cabin—in a fully automated manner and therefore in a driverless manner. These transport vehicles are conventionally driven by diesel-electric, diesel-hydraulic or fully electric means, in particular by battery.

Such transport vehicles can discharge containers at a passive transfer station or pick them up therefrom by correspondingly raising and lowering their lifting platform, as described e.g. in DE 10 2007 039 778 A1.

In the known transport vehicles, in particular the guide surfaces formed by so-called position-adapters are arranged for the transportation of ISO-containers of standard width. In this connection, the guide surfaces comprise a minimum and, in particular, unchangeable distance from each other, which is somewhat greater than the standard width of 2438 mm but less than the width of a wide-body container. Thus in particular wide-body containers cannot be set down in a stable manner on a set-down surface disposed in the region of the minimum distance between the guide surfaces. However, this would be required for secure transportation since the containers are not generally locked with their corner fittings by means of twist locks in the case of such transport vehicles. Secure and stable set-down on the regions of the guide surfaces which are spaced widely enough apart and usually extend in an inclined manner is not possible since in this case there is a risk of slipping down on the inclined guide surfaces and of the container being in an unstable inclined position. Thus, corresponding wide-body containers have previously not been transported using the above-mentioned transport vehicles and in particular not loaded on corresponding transport vehicles in an automated manner but have been handled and transported using manually operated transport vehicles such as e.g. reach stackers.

Further transport vehicles for containers are known from DE 10 2009 025 051 A1 and from DE 10 2013 114841 A1.

SUMMARY OF THE INVENTION

The present invention provides an improved transport vehicle for containers which permits particularly easy adaptation for secure and stable transportation of differently designed containers even in automated container terminals.

A transport vehicle for containers, having a first set-down surface on which a container can be set down, and having two mutually opposing guide surfaces which extend towards one another in the direction of the first set-down surface in order to guide a container during set-down on the transport vehicle in the direction of the first set-down surface, wherein the first set-down surface is disposed between the guide surfaces and wherein a lifting platform which can be raised and lowered is disposed between the guide surfaces, is improved in that an adapter is provided which can be moved between a standby position and an operating position in such a way that a container is guided onto the first set-down surface during set-down on the transport vehicle when the adapter is in the standby position and the lifting platform is lowered to a transport position, and is guided onto a second set-down surface, which is formed by the lifting platform, when the adapter is placed onto the transport vehicle in the operating position and in this connection the lifting platform in the transport position is placed via the adapter onto the transport vehicle.

In this manner, existing transport vehicles can be adapted in a particularly simple and flexible manner upon requirement by means of temporary provision of the adapter in the operating position below the lifting platform and associated temporary formation of a second set-down surface by the lifting platform placed onto the adapter, in order to be able to securely pick up and transport containers which are formed differently. The arrangement of the guide surfaces does not have to be changed for this purpose and even the width of the first guide surface does not have to be increased. By placement of the lifting platform, which is performed in the transport position, onto the adapter which is likewise placed in its operating position, the second set-down surface provided by the lifting platform is—as seen in a lowering direction of a container to be set down—operationally upstream of the first set-down surface in such a way that the first set-down surface is deactivated or is inoperative and is no longer reached from the lower side, in particular the lower corner fittings, of the container to be set down, in order to be set down on the first set-down surface. Therefore, during lowering, a container is inevitably set down on the second set-down surface, which is formed by the lifting platform, instead of on the first set-down surface and in this connection is possibly correspondingly guided and orientated by at least one of the two guide surfaces. In contrast, when the adapter is in the standby position, the first set-down surface is activated and operative so that, during lowering of the lifting platform to the transport position, a container is inevitably set down on the first set-down surface and in this connection is possibly correspondingly guided and orientated by at least one of the two guide surfaces. The second set-down surface is correspondingly deactivated and inoperative in the standby position. A transport vehicle designed in this way permits secure and stable transport of differently designed containers, in particular even when the transport vehicle is guided in a fully automated manner and is accordingly designed and operated as a driverless transport vehicle in the sense of an AGV. In this connection, the adapter can thus be moved manually between the standby position and the operating position. In this case, no permanent connection or guidance of the adapter on the transport vehicle is required.

For this purpose, the adapter can be designed as a simple, passive and, in particular, self-supporting element which, in the operating position in its vertical position between the guide surfaces, is held solely by its lower side being set down or placed with surface contact on a stationary support surface of the transport vehicle, which is fixed in relation to the guide surfaces, without an active holding drive being required for holding in the vertical position. The adapter merely has to comprise, in itself, suitable dimensions and bearing capacity in order to support the lifting platform which is placed in the transport position, even under the effect of a container which is set down. For this purpose, the adapter is preferably produced from a steel material. The adapter which is disposed in the operating position advantageously also ensures that a lifting drive for lifting and lowering the lifting platform is bridged in relation to the force flow so that loads originating from the lifting platform in the transport position placed on the adapter are dissipated via the adapter to the support surface of the transport vehicle without thereby loading the lifting drive.

In an advantageous manner provision is made that the adapter is mounted on the transport vehicle so as to be displaceable between the standby position and the operating position. In this case, the adapter is thus connected to the transport vehicle via a suitable mounting arrangement. In this way, the adapter can easily be moved and thus guided e.g. by displacing and/or pivoting in such a way that the second set-down surface is activated and the first set-down surface is deactivated and vice versa. In particular, the adapter can be rotatably mounted so that, in the standby position, it can be disposed in a space-saving manner with its longitudinal extension vertical and thus upright in order to be pivoted therefrom to the horizontal operating position. Even a translationally movable mounting arrangement can be designed in a simple manner because in this connection only one linear drive without a lever mechanism required for rotation is to be installed.

Provision can also be advantageously made that in the standby position the adapter is disposed next to a lower side of the lifting platform and in this connection protrudes preferably into an opening formed on the lower side when the lifting platform is lowered to the transport position. As a result, the adapter can be accommodated in a particularly space-saving manner on the transport vehicle. In this manner, the movement region of the lifting platform below the lifting platform can also be kept free so that more space is available for lowering the lifting platform to the transport position in order thereby to set down containers on the first set-down surface. Moreover, in order to relieve its lifting drive the lifting platform can thus also be lowered in the transport position on the vehicle frame when the adapter is in the standby position.

In an advantageous manner provision is made that the first set-down surface and the second set-down surface are disposed with respect to one another such that a container set down on the first set-down surface is positioned with its lower side, in particular with its lower corner fittings, between the guide surfaces in a preferably horizontal first plane and a container set down on the second set-down surface is positioned with its lower side, in particular with its lower corner fittings, between the guide surfaces in a preferably horizontal second plane, the second plane is disposed above the first plane, and, in the second plane, the guide surfaces are spaced apart at a greater distance from each other than in the first plane. In this way, containers of different widths, in particular wide-body containers, which cannot be set down in a stable manner on the first set-down surface with a horizontally orientated lower side between the guide surfaces, can be set down in a stable and therefore secure manner on the second set-down surface in a horizontal orientation between the guide surfaces on the temporarily provided second set-down surface. If then a container of standard width is to be transported, the adapter can easily be moved into the standby position. As a result, the first set-down surface is then activated and operative when the lifting platform is lowered to the transport position. This is advantageous since, for containers of standard width which is narrower than wide-body containers, improved orientation and positioning is effected by reason of the smaller minimum distance between the guide surfaces in the region of the lower first plane.

The aforementioned bridging of the lifting drive of the lifting platform which is lowered to the transport position in order to form the second set-down surface is achieved in a particularly simple and effective manner in that the adapter is disposed in the operating position below the lifting platform between the lifting platform and a vehicle frame of the transport vehicle and in this connection is placed onto the vehicle frame so that the lifting platform can be set down in the transport position on the adapter.

In a structurally simple manner, provision is made that the adapter is plate-like and has a planar upper side and, opposite thereto, a planar lower side extending in parallel therewith, and that in the operating position the upper side facing the lifting platform and the lower side facing an upper side of a vehicle frame are horizontally orientated. This permits stable support of the lifting platform, which is lowered to the transport position, on the adapter located in the operating position. The adapter can also be designed in a frame-like manner.

Even more stable support and bridging of the lifting drive can be achieved by virtue of the fact that two adapters are provided which, starting from their standby position, are mounted so as to be movable away from one another to the operating position, in particular transversely to a longitudinal direction of the transport vehicle.

In a constructionally simple manner provision is also made that each adapter can be moved by means of a positioning device with a positioning drive between the standby position and the operating position, wherein the positioning drive is preferably designed as a linear drive and in particular includes a lifting cylinder, preferably an electric cylinder or hydraulic cylinder, or a belt drive, chain drive or rack-and-pinion drive.

In a constructionally simple manner provision is also made that each adapter is disposed on a positioning arm of the positioning device and the positioning arm is mounted on the transport vehicle in a movable, in particular pivotable, manner and is drivingly connected to the positioning drive in order to move the adapter between the standby position and the operating position.

A particularly advantageous use of a transport vehicle designed as described above is achieved in relation to the picking up and transportation of a container designed as a wide-body container.

An exemplified embodiment of the invention is explained in greater detail with reference to the following description.

Figure 1:
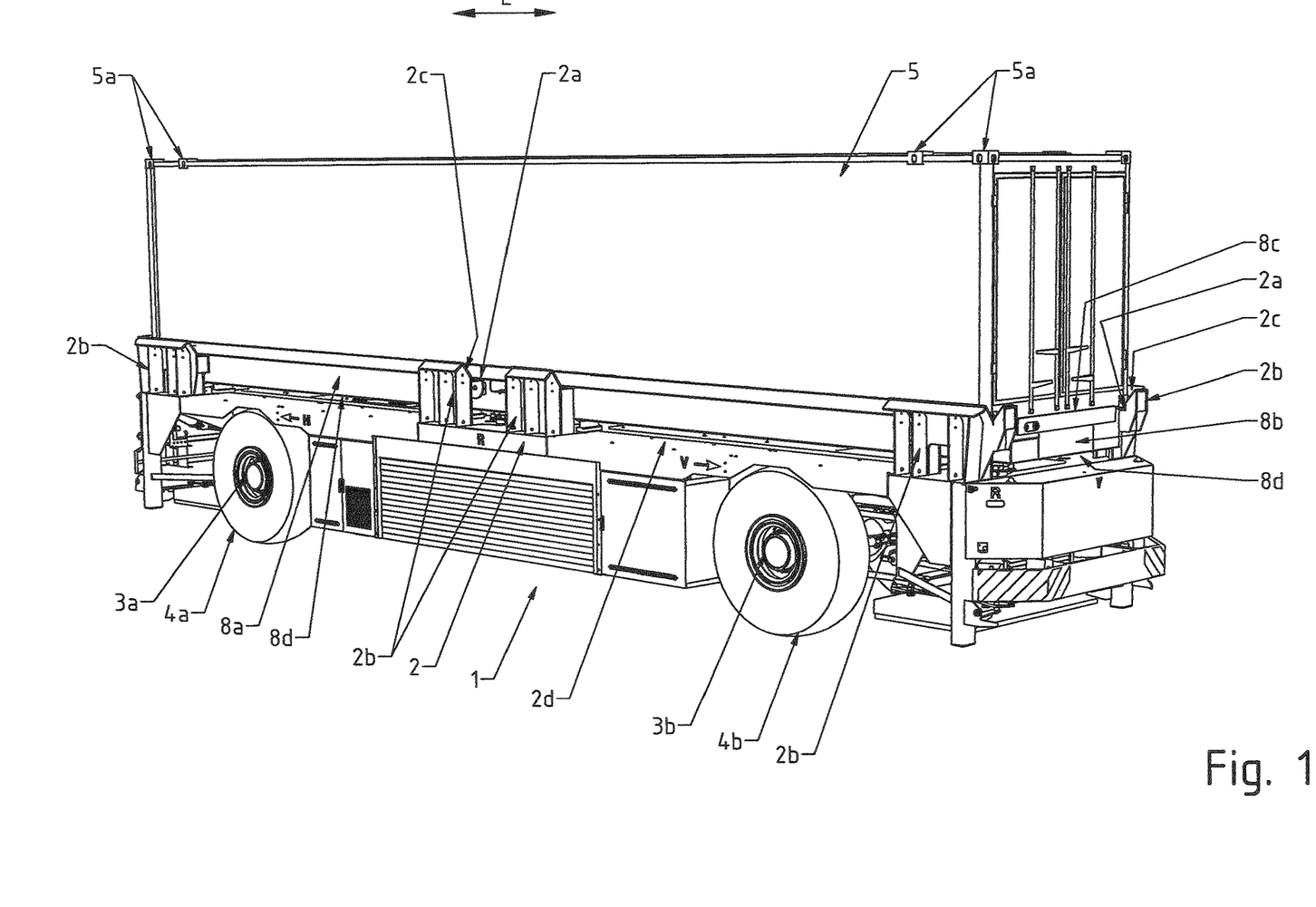
FIG. 1 shows a perspective view of a transport vehicle designed as a lifting AGV.

FIG. 1 shows a perspective view of a floor-bound transport vehicle 1 for containers 5, in particular ISO-containers and wide-body containers, which is designed in the manner of an AGV, able to be operated in a fully automated driverless manner, and in particular having no driver's cabin. However, the transport vehicle 1 can also be operated manually or in a semi-automated manner and for this purpose can have a driver's cabin. The transport vehicle 1 designed as a four-wheeled vehicle, comprises a vehicle frame 2 on which, on a common front axle 3a, two front wheels 4a and, on a common rear axle 3b, two rear wheels 4b are mounted. The four wheels 4a, 4b are provided with a tire arrangement which is preferably an air-filled rubber tire arrangement in the sense of tires. By means of the wheels 4a the floor-bound transport vehicle 1 can travel freely and therefore in a non-rail-bound manner.

Furthermore, the transport vehicle 1 comprises a travel drive which substantially consists of a front electric motor, a front power take-off gear, a rear electric motor and a rear power take-off gear. As seen in the longitudinal direction L of the transport vehicle 1, the front electric motor is attached below the vehicle frame 2 centrally and in the region of the front axle 3a. As seen in the longitudinal direction L of the transport vehicle 1, the rear electric motor is attached below the vehicle frame 2 centrally and in the region of the rear axle 3b. The front electric motor drives the two front wheels 4a via the front power take-off gear, and the rear electric motor drives the two rear wheels 4b via the rear power take-off gear. Therefore, the transport vehicle 1 has an all-wheel drive. The drive unit can be designed in a diesel-electric or fully electric manner with a battery, in particular a lead battery.

On an upper side 2d of its vehicle frame 2 extending substantially horizontally, the transport vehicle 1 comprises a first set-down surface 2a, extending in a horizontal plane, on which a 45 foot long container 5, designed as an ISO container, is set down. In the case of containers of this length, in each case at the opposite ends in the longitudinal direction L, corresponding corner fittings 5a are provided offset at a 45 foot position and additionally, also starting from each end, offset by 2.5 feet towards the middle of the container at a 40 foot position. Consequently, the first set-down surface 2a extends in the longitudinal direction L between the two 45 foot positions. In this way, a 40 foot long container 5 or two 20 foot long containers 5 one behind the other as seen in the longitudinal direction L and designed as (an) ISO container(s), can be set down on the first set-down surface 2a, in particular via its (their) lower corner fittings 5a. The corner fittings 5a of a 40 foot long container 5 set down centrally in the longitudinal direction L are disposed at the 40 foot position. 20 foot long containers 5 are disposed with their corner fittings 5a which face the opposite ends of the transport vehicle 1 in the longitudinal direction L, at the 45 foot position. The corner fittings 5a which face the centre of the vehicle as seen in the longitudinal direction L are correspondingly disposed at a 20 foot position of the first set-down surface 2a.

Furthermore, two mutually opposing guide surfaces 2c are provided on the vehicle frame 2 of the transport vehicle 1, the first set-down surface 2a being disposed between said guide surfaces. In this connection, the first set-down surface 2a is disposed fixed with respect to the guide surfaces 2c. The preferably planar guide surfaces 2c extend in each case in the longitudinal direction L between the two outer 45 foot positions. The guide surfaces 2c also extend towards each other in the direction of the first set-down surface 2a in a hopper-like manner, but terminate at a minimum distance d1 with respect to each other (see FIG. 2a). In other words, the guide surfaces 2c are spaced apart from each other at their lower end facing the first set-down surface 2a by the minimum distance d1 and, starting from this point, extend upwards away from the first set-down surface 2a and away from each other, by which extension the guide surfaces 2c are increasingly mutually spaced apart in the upwards direction. The minimum distance d1 therefore corresponds to a maximum width of the first set-down surface 2a at a right angle to the longitudinal direction L. By means of this design of the guide surfaces 2c, a container 5 or the lower corner fitting fittings 5a thereof can, during lowering effected for set-down on the transport vehicle 1, be guided by the guide surfaces 2c in the direction of the first set-down surface 2a and can be laterally orientated in a corresponding manner with respect to the first set-down surface 2a. Furthermore, the guide surfaces 2c serve to secure containers 5 set down on the transport vehicle 1 against slipping. This applies for all the container lengths mentioned above.

FIG. 1 shows that the first set-down surface 2a and each guide surface 2c is composed of a plurality of separate mutually spaced partial surfaces which are each formed by a guide element 2b also designated as a position adapter. For this purpose, in the region of the corners of two notional rectangles disposed one behind the other as seen in the longitudinal direction L, in each case one guide element 2b is disposed on the vehicle frame 2. Therefore, at each of the two ends of the transport vehicle 1, which are opposite each other in the longitudinal direction L, two outer guide elements 2b are disposed which cover the 45 foot positions and the 40 foot positions and accordingly extend therebetween with their partial surfaces of the first set-down surface 2a and of the associated guide surface 2c. Between the outer guide elements 2b, in the region of the centre of the vehicle, two further pairs of inner guide elements 2b are disposed which each cover one of the 20 foot positions with their partial surfaces. The inner guide elements 2b respectively allocated to one long side can also be combined to form a single inner guide element 2b, by which the two 20 foot positions are covered.

FIG. 1 also shows that, on the vehicle frame 2, as seen in the longitudinal direction L of the transport vehicle 1, a first lifting platform 8a and a second lifting platform 8b are disposed one behind the other. The transport vehicle 1 is thus designed as a so-called lifting AGV.

Figure 2A:
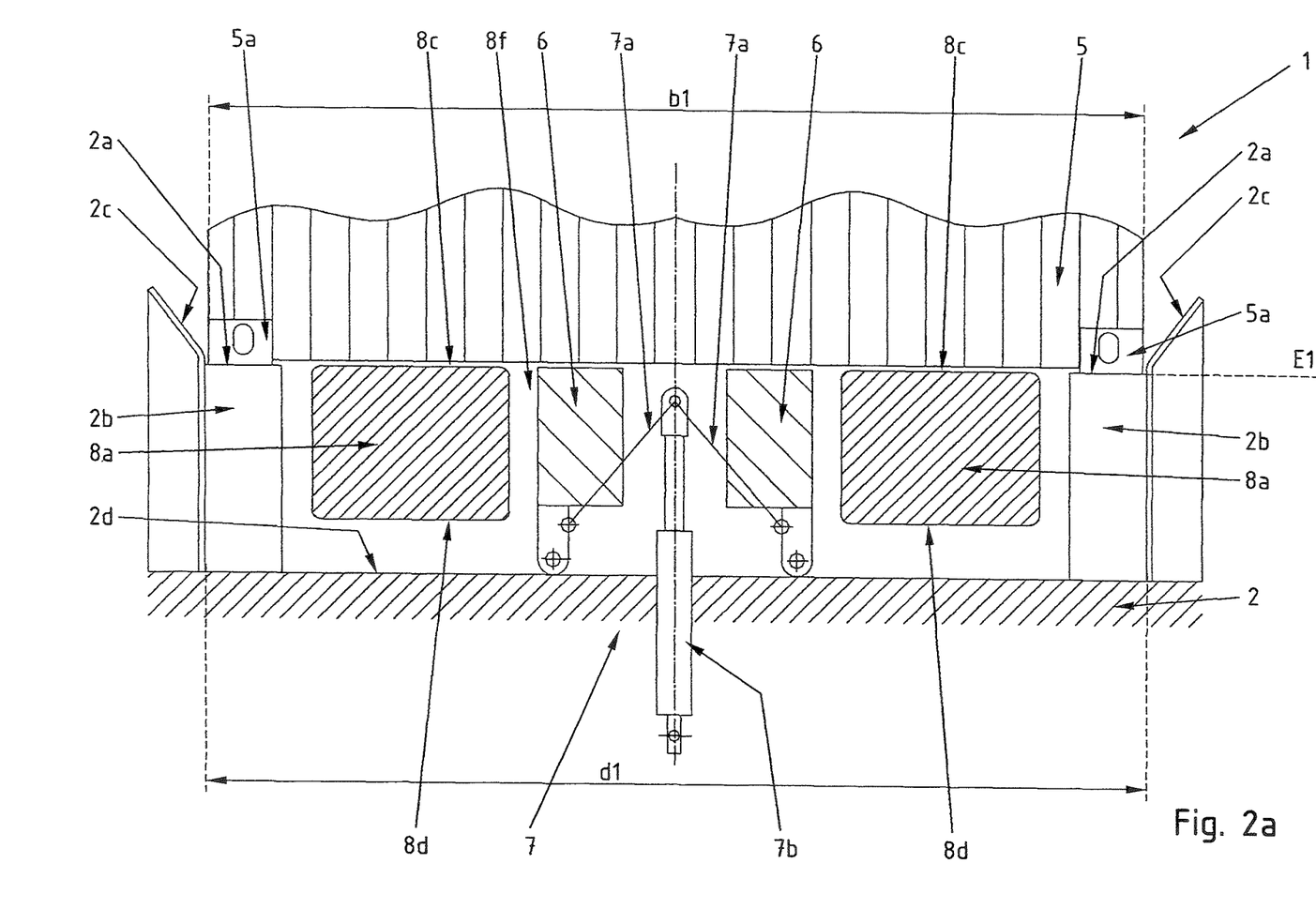
FIG. 2a shows a schematic cross-sectional view of a front side of the transport vehicle according to FIG. 1 with two adapters in a standby position.

The lifting platforms 8a, 8b are disposed in particular between the guide surfaces 2c, wherein a partial surface of the first set-down surface 2a extends between each lifting platform 8a, 8b and each guide surface 2c (see FIG. 2a). Starting from the respective guide surface 2c, each partial surface of the first set-down surface 2a extends preferably approximately far enough in the direction of the lifting platform 8a, 8b that a corner fitting 5a can lie on the partial surface with full surface contact. The lifting platforms 8a, 8b are each formed in a frame-like manner and can be raised and lowered via their respective lifting drive independently of each other or in synchronism relative to the guide surfaces 2c and between these and the partial surfaces of the first set-down surface 2a adjoining same. By means of the lifting platforms 8a, 8b containers 5 can thus be set down on the first set-down surface 2a and be raised starting therefrom.

In this connection, raising and lowering between a raised lifting position, in which a lower side 8d of the lifting platform 8a, 8b is spaced apart from the upper side 2d of the vehicle frame 2, and a transport position is possible. In the lifting position the lifting platforms 8a, 8b support the containers 5 standing on their upper side 8c. The lifting platforms 8a, 8b are lowered into the transport position in order for containers 5 to be set down on the first set-down surface 2a. FIG. 1 shows the two lifting platforms 8a and 8b both in the lowered transport position. In the transport position, the lower side 8d is in each case lowered on the upper side 2d, whereby the lifting drive disposed between the vehicle frame 2 and the corresponding lifting platform 8a, 8b is in each case bridged in relation to a force flow between the associated lifting platform 8a, 8b and the vehicle frame 2. Alternatively or additionally, for the purpose of placing down on the vehicle frame 2, in the transport position the upper side 8c of the lifting platform 8a, 8b can additionally be spaced apart from the lower side of the set-down container 5 and therefore not be in contact therewith. In this way it is achieved that at least the lifting drives and also the lifting platforms 8a, 8b are not loaded by set-down containers 5 since all loads applied by set-down containers 5 and the corresponding force flow via the first set-down surface 2a are dissipated or introduced into the vehicle frame 2. The lifting platforms 8a, 8b are thus located in the transport position during transportation of containers 5.

Furthermore, the length of each individual lifting platform 8a, 8b is in each case chosen so that on the upper side 8c of the corresponding lifting platform 8a, 8b in each case a 20 foot long container 5, not illustrated, can be picked up. The first lifting platform 8a and the second lifting platform 8b also complement each other for the case where they are raised and lowered in synchronism to form a large lifting platform on which a 40 foot long container 5 or the 45 foot long container 5 illustrated in FIG. 1 can be received. The transport vehicle 1 is thus designed as a heavy-duty transport vehicle in the sense defined in the introduction and is arranged for a corresponding payload.

The transport vehicle 1 comprises on each lifting platform 8a, 8b a total of two adapters 6 which are formed in a plate-like manner and of which the mode of operation will be explained hereinafter.

FIG. 2a shows a schematic cross-sectional view of a front side of the transport vehicle according to FIG. 1 with two adapters 6 in a standby position. In the same manner, two adapters 6 are disposed in the standby position at the rear-side end of the transport vehicle 1 opposite the front side. For reasons of symmetry, the explanations given hereinafter in relation to the first lifting platform 8a apply in a similar manner for the second lifting platform 8b and the adapters 6 disposed at that location.

The first lifting platform 8a facing the front side is illustrated in the lowered transport position, in which the upper side 8c is spaced apart from the lower side of the container 5 set down on the first set-down surface 2a. According to the frame-like design of each of the two lifting platforms 8a, 8b, a continuous opening 8f extends from the lower side 8d facing the vehicle frame 2 to the upper side 8c of the lifting platform 8a or 8b facing the container 5. Also shown are the two outer guide elements 2b facing the front side. The two outer guide elements 2b facing the rear side and shown in FIG. 1 are, like the inner guide elements 2b shown in FIG. 1, concealed and therefore not illustrated in FIG. 2a.

The two adapters 6 can be moved between a standby position and an operating position. For this purpose, the adapters 6 are mounted so as to be correspondingly movable on the transport vehicle 1, e.g. via a common positioning device 7, by means of which the adapters 6 can be moved in a synchronous and automated manner between the respective standby position and operating position. Alternatively, a dedicated positioning device 7 can also be provided for each adapter 6. In the standby position illustrated in FIG. 2a, the adapters 6 are disposed next to the lower side 8d of the lifting platform 8a, wherein they protrude into the opening 8f formed on the lower side 8d. The positioning device 7 which is mounted on the vehicle frame 2 also protrudes with its vertically extending lifting cylinder, which serves as a positioning drive 7b, between the two adapters 6 into the opening 8f. The lifting cylinder is preferably designed as an electric cylinder or hydraulic cylinder. Other linear drives can also be used as the positioning drive 7b such as e.g. a belt drive, chain drive or rack and pinion drive.

When the adapters 6 are in the standby position, a container 5 is inevitably guided onto the first set-down surface 2a and set down thereon during set-down on the transport vehicle 1, even when the lifting platform 8a is lowered to the transport position. This situation is illustrated in FIGS. 1 and 2a. When the adapters 6 are in the operating position, in which they are placed onto the transport vehicle 1, and in this connection also the lifting platform 8a in the transport position is placed onto the transport vehicle 1 via the two adapters 6, a second set-down surface 8e disposed between the guide surfaces 2c is formed by the lifting platform 8a, a container 5 being inevitably guided onto said second set-down surface and set-down thereon during set-down on the transport vehicle 1. This situation is illustrated in FIG. 2c described below.

The container 5 illustrated in FIG. 2a and set down on the first set-down surface 2a has a width b1 of 2438 mm which corresponds to the standard width of ISO containers and which can be received in the region of the minimum distance d1 between the guide surfaces 2c. The container 5 is in this connection set down with its lower corner fittings 5a on the first set-down surface 2a and in particular on the partial surfaces thereof which are formed by the outer guide elements 2b. The lower corner fittings 5a also designated as corner-castings and disposed on the lower side of the container 5 are in this way positioned in a horizontal plane E1 which extends in parallel with the horizontal first set-down surface 2a and is, in particular, formed thereby. The lower side of the container 5 is also orientated horizontally and in parallel with the first plane E1.

Figure 2B:
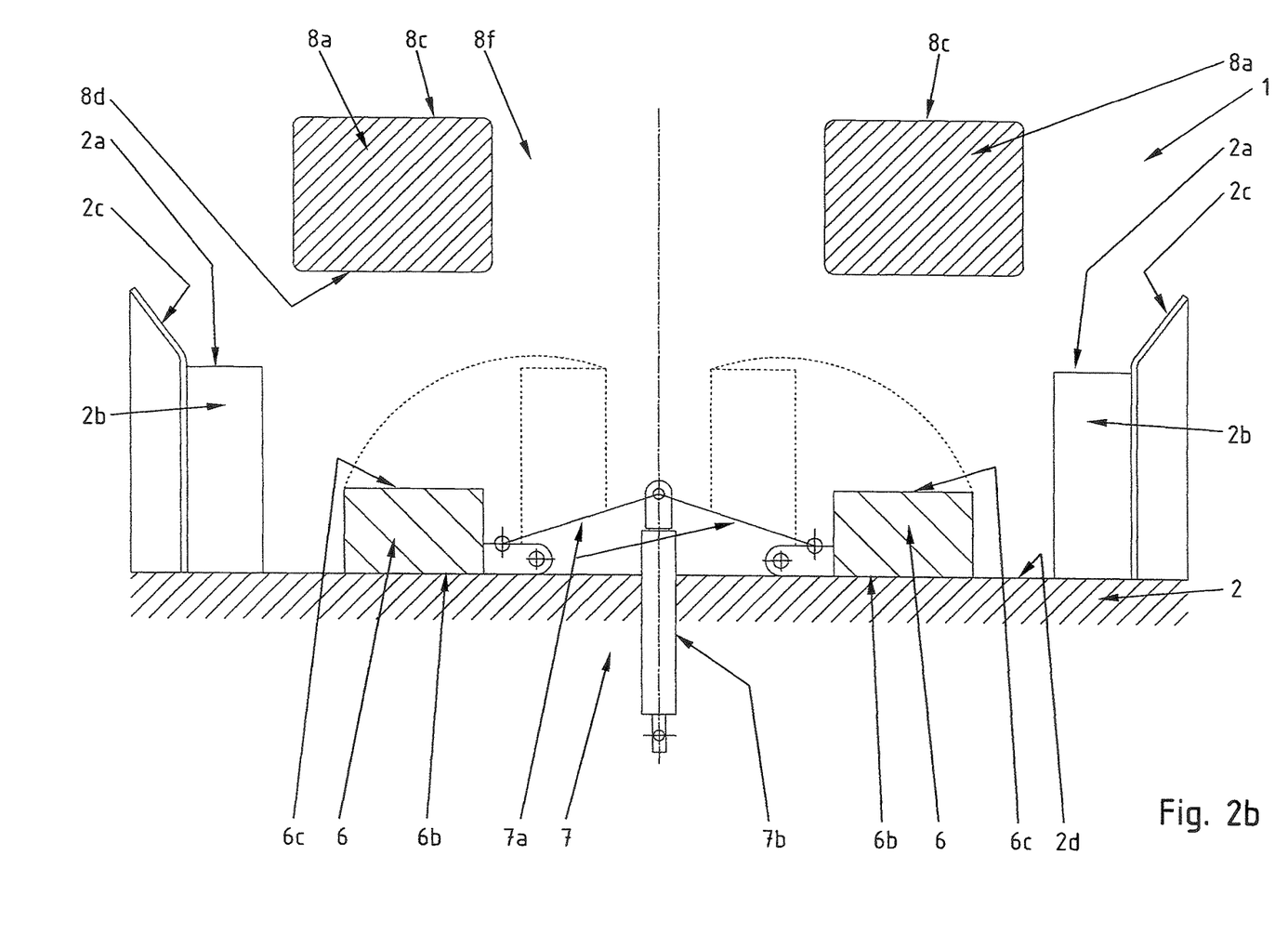
FIG. 2b shows the cross-sectional view according to FIG. 2a with two adapters in an operating position and a lifting platform raised to a lifting position.
Figure 2C:
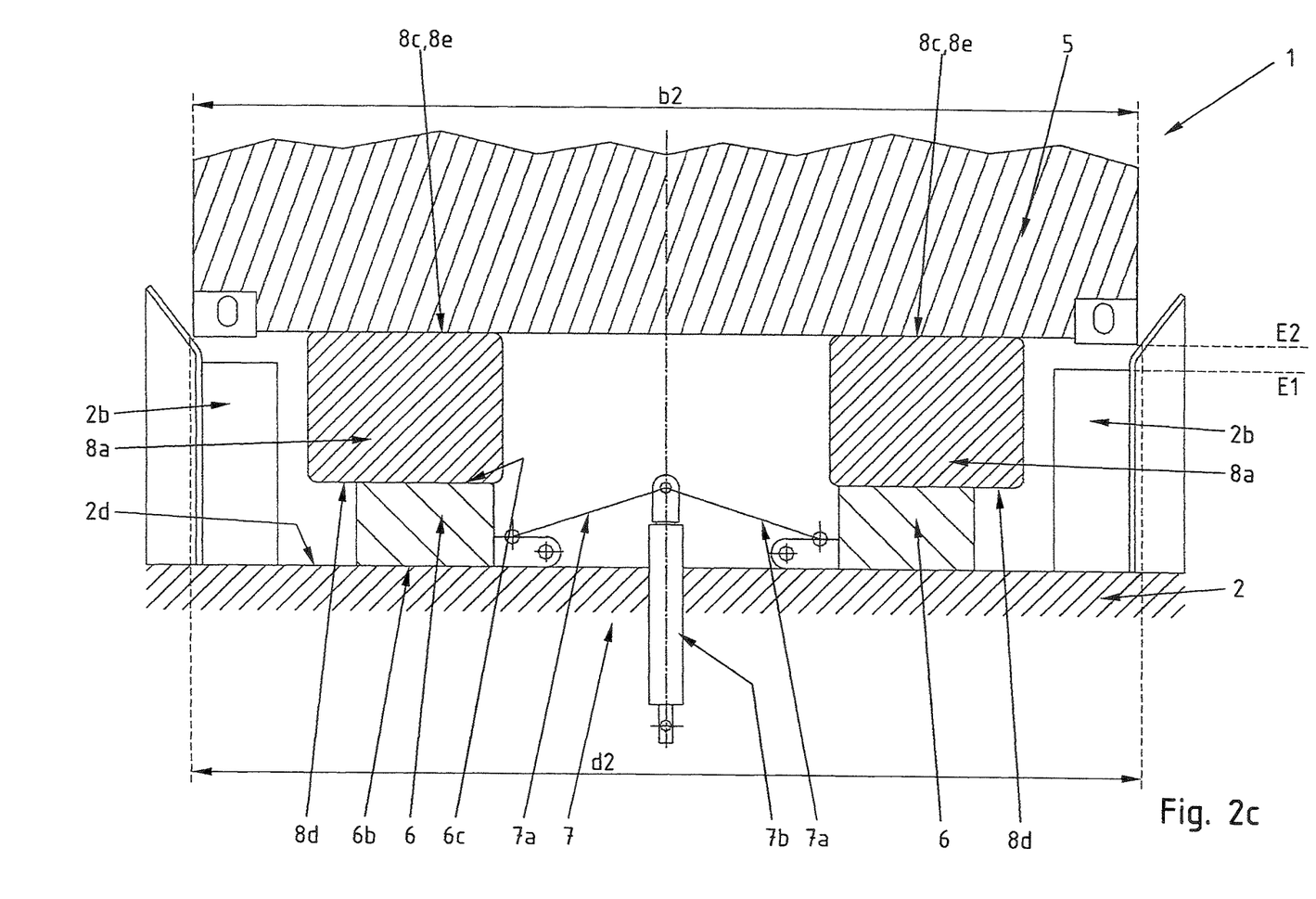
FIG. 2c shows the cross-sectional view according to FIG. 2b with the lifting platform lowered to a transport position.

A wide-body container with a width b2, which amounts to about 2500 to 2550 mm and is therefore wider than the minimum distance d1 cannot be set down in a stable manner on the first set-down surface 2a with its lower side or its corner fittings 5a horizontally orientated since there is a risk of slippage along the guide surfaces 2a and therefore of the container 5 being in an inclined position which is to be avoided (see FIG. 2c). For secure and stable set-down of a container 5 designed as a wide-body container the adapters 6 provided on the transport vehicle 1 must be moved into the operating position. As a result, the first set-down surface 2a is deactivated or becomes inoperative and the second set-down surface 2b is activated or becomes operative when the lifting platform 8a in the transport position is placed on the adapters 6 located in the operating position.

FIG. 2b shows the cross-sectional view according to FIG. 2a with the two adapters 6 in the operating position, wherein the lifting platform 8a is raised to a lifting position. The positioning device 7—also shown in FIG. 2b—for the two adapters 6 comprises two positioning arms 7a in addition to the positioning drive 7b. In this connection, each positioning arm 7a is connected with a lower end in an articulated manner to one of the adapters 6 and is connected with an opposite upper end in an articulated manner at a common pivot point to the positioning drive 7b. Each adapter 6 is mounted on the upper side 2d of the vehicle frame 2 in an articulated manner and in such a way as to be rotatable about an axis of rotation extending in the longitudinal direction L. Actuation of the positioning drive 7b causes a vertical position change of the pivot point, whereby the positioning arms 7a cause the adapters 6 to rotate in opposite directions to one another. The adapters 6 rotate by approximately 90 degrees.

As a consequence, the adapters 6 can be moved from their upright arrangement in the standby position next to the movement region of the lifting platform 8a (see FIG. 2a) in a manner directed away from one another and to a horizontal arrangement in the operating position in the movement region of the lifting platform 8a below its lower side 8d. For this purpose, as indicated in FIG. 2b, the lifting platform 8a firstly has to be raised in order to clear a pivot region for the adapters 6 which extends on both sides further in the direction of the guide elements 2b than the opening 8f. In the operating position each adapter 6 is placed with its planar lower side 6b onto the upper side 2d which therefore serves as a support surface of the transport vehicle 1. The support surface is then cleared by the adapter 6 in the standby position (see FIG. 2a). Both adapters 6 also have a planar upper side 6b. In the operating position, the upper side 6c facing the lifting platform 8a and the lower side 6b facing the upper side 2d are horizontally orientated.

FIG. 2c illustrates the cross-sectional view according to FIG. 2b with the first lifting platform 8a lowered to a transport position. In this connection, as explained previously with reference to FIG. 2b, the adapters 6 are disposed in the operating position below the lifting platform 8a between the lifting platform 8a and the vehicle frame 2 and in this connection are placed onto the vehicle frame 2 or its upper side 2d so that the lifting platform 8a can be set down in the transport position, as illustrated in FIG. 2c, on the adapter 6. The second set-down surface 8e which is located upstream of the deactivated first set-down surface 2a is formed by the planar and horizontally extending upper side 8c of the lifting platform 8a which in the transport position is placed onto the adapters 6 located in the operating position. In this connection, the two set-down surfaces 2a, 8e extend in mutually parallel horizontal planes.

A container 5 designed as a wide-body container is set down on the now operative second set-down surface 8e. For this purpose, both lifting platforms 8a, 8b have been lowered to the transport position and in this connection placed onto the adapters 6. It is apparent that the container 5 which is set down in particular with its lower side, extending between the lower corner fittings 5a, on the second set-down surface 8e is positioned with its lower corner fittings 5a between the guide elements 2b in a horizontal second plane E2. The second plane E2 is disposed above the first plane E1. By appropriate dimensioning of the thickness or height of the identically formed adapters 6 the second plane E2 is disposed in a region between the guide surfaces 2c of a height at which the guide surfaces 2c no longer extend in parallel to one another at the minimum distance d1 but are spaced apart from one another at a greater distance d2 than in the first plane E1. In this way, a wide-body container can be set down in a secure and stable horizontal orientation on the second set-down surface 8e formed by the upper side 8c of the lifting platforms 8a, 8b without the risk of slippage of its lower corner fittings 5a on the inclined guide surfaces 2c.

When a container 5 of the standard width b1 is to be set down on the transport vehicle 1 the adapters 6 can be moved back into their standby position. This ensures that the movement region of the lifting platform 8a, 8b is then cleared in order to be lowered in the transport position to such an extent that the upper side 8c is located downstream of the first set-down surface 2a. As a result, the second set-down surface 8e is deactivated. The container 5 is then guided inevitably onto the first set-down surface 2a, which has thus become operative, and can be guided and securely set down thereon without the lower side of the container 5 being in contact only with the upper side 8c.

By means of the arrangement of the adapters 6 and in particular of the associated positioning devices 7, shown in the Figures and described above, above the vehicle frame 2 and in the region of the opening 8f, particularly simple retrofitting of transport vehicles 1 is possible in particular in order to use same for automated transportation of wide-body containers. The raising and lowering movement of the lifting platforms 8a, 8b is also advantageously not hindered since the adapters 6 are disposed, in both the standby position and also in the operating position, outside the movement region of the lifting platforms 8a, 8b extending above the upper side 8c. In this way, lifting AGVs fitted with corresponding adapters 6 can discharge containers 5 at a passive transfer station or pick them up therefrom as described e.g. in DE 10 2007 039 778 A1.

Fundamentally, it is also possible for only one plate-like or frame-like adapter 6 to be provided which in its operating position is placed onto the transport vehicle 1 below the lifting platforms 8a and 8b so that the lifting platforms 8a, 8b in the lowered transport position can be placed onto the adapter 6 and in this connection can be fixed with their upper side 8c for forming the second set-down surface 8e correspondingly high enough above the first set-down surface 2a.

The invention claimed is:

1. A transport vehicle for containers, said transport vehicle comprising a first set-down surface on which a container can be set down, and having two mutually opposing guide surfaces which extend towards one another in a direction of the first set-down surface in order to guide a container during set-down on the transport vehicle in the direction of the first set-down surface, wherein the first set-down surface is disposed between the guide surfaces and wherein a lifting platform which can be raised and lowered is disposed between the guide surfaces, and wherein an adapter is provided which can be moved between a standby position and an operating position in such a way that a container is guided onto the first set-down surface during set-down on the transport vehicle when the adapter is in the standby position and the lifting platform is lowered to a transport position, and is guided onto a second set-down surface which is formed by the lifting platform when the adapter is placed onto the transport vehicle in the operating position and in this connection the lifting platform in the transport position is placed via the adapter onto the transport vehicle.

2. The transport vehicle as claimed in claim 1, wherein the adapter is movably mounted on the transport vehicle between the standby position and the operating position.

3. The transport vehicle as claimed in claim 2, wherein in the standby position the adapter is disposed next to a lower side of the lifting platform and protrudes into an opening formed on the lower sided when the lifting platform is lowered to the transport position.

4. The transport vehicle as claimed in claim 3, wherein the first set-down surface and the second set-down surface are disposed with respect to one another such that a container set down on the first set-down surface is positioned with lower corner fittings between the guide surfaces in a horizontal first plane and a container set down on the second set-down surface is positioned with lower corner fittings between the guide surfaces in a horizontal second plane, wherein the second plane is disposed above the first plane, and in the second plane the guide surfaces are spaced apart at a greater distance from each other than in the first plane.

5. The transport vehicle as claimed in claim 4, wherein the adapter in the operating position is disposed below the lifting platform between the lifting platform and a vehicle frame of the transport vehicle and in this connection is placed onto the vehicle frame so that the lifting platform in the transport position can be set down on the adapter.

6. The transport vehicle as claimed in claim 5, wherein the adapter is plate-like and has a planar upper side and, opposite thereto, a planar lower side extending in parallel therewith, and wherein in the operating position the upper side facing the lifting platform and the lower side facing an upper side of a vehicle frame are horizontally orientated.

7. The transport vehicle as claimed in claim 6, further including a second adapter, wherein the two adapters are provided which, starting from their standby position, are mounted so as to be movable away from one another transversely to a longitudinal direction of the transport vehicle to the operating position.

8. The transport vehicle as claimed in claim 7, wherein each adapter can be moved by a positioning device comprising a positioning drive between the standby position and the operating position, wherein the positioning drive is designed as a linear drive and includes a lifting cylinder, or a belt drive, chain drive or rack-and-pinion drive.

9. The transport vehicle as claimed in claim 8, wherein each adapter is disposed on a positioning arm of the positioning device and the positioning arm is mounted on the transport vehicle in a pivotable manner and is drivingly connected to the positioning drive in order to move the adapter between the standby position and the operating position.

10. Use of a transport vehicle as claimed in claim 1 for transportation of a container designed as a wide-body container.

11. The transport vehicle as claimed in claim 1, wherein in the standby position the adapter is disposed next to a lower side of the lifting platform.

12. The transport vehicle as claimed in claim 1, wherein the first set-down surface and the second set-down surface are disposed with respect to one another such that a container set down on the first set-down surface is positioned with its lower side between the guide surfaces in a first plane and a container set down on the second set-down surface is positioned with its lower side between the guide surfaces in a second plane, wherein the second plane is disposed above the first plane, and in the second plane the guide surfaces are spaced apart at a greater distance from each other than in the first plane.

13. The transport vehicle as claimed in claim 12, wherein the first set-down surface and the second set-down surface are disposed with respect to one another such that a container set down on the first set-down surface is positioned with lower corner fittings between the guide surfaces in the first plane and wherein the first plane is horizontal, and a container set down on the second set-down surface is positioned with lower corner fittings between the guide surfaces in the second plane and wherein the second plane is horizontal.

14. The transport vehicle as claimed in claim 1, wherein the adapter in the operating position is disposed below the lifting platform between the lifting platform and a vehicle frame of the transport vehicle and in this connection is placed onto the vehicle frame so that the lifting platform in the transport position can be set down on the adapter.

15. The transport vehicle as claimed in claim 1, wherein the adapter is plate-like and has a planar upper side and, opposite thereto, a planar lower side extending in parallel therewith, and wherein in the operating position the upper side facing the lifting platform and the lower side facing an upper side of a vehicle frame, wherein the upper and lower sides are horizontally orientated.

16. The transport vehicle as claimed in claim 1, further including a second adapter, wherein the two adapters are provided which, starting from their standby position, are mounted so as to be movable away from one another to the operating position.

17. The transport vehicle as claimed in claim 16, wherein the two adapters are mounted so as to be movable transversely to a longitudinal direction of the transport vehicle.

18. The transport vehicle as claimed in claim 16, wherein each adapter can be moved by a positioning device comprising a positioning drive between the standby position and the operating position.

19. The transport vehicle as claimed in claim 18, wherein the positioning drive is designed as a linear drive and includes a lifting cylinder, or a belt drive, chain drive or rack-and-pinion drive.

20. The transport vehicle as claimed in claim 18, wherein each adapter is disposed on a positioning arm of the positioning device and the positioning arm is mounted on the transport vehicle in a movable manner and is drivingly connected to the positioning drive in order to move the adapter between the standby position and the operating position.

* * * * *

UNITED STATES PATENT AND TRADEMARK OFFICE
CERTIFICATE OF CORRECTION

PATENT NO.         : 10,611,288 B2
APPLICATION NO.    : 16/062341
DATED              : April 7, 2020
INVENTOR(S)        : Mike Hegewald and Jannis Moutsokapas It is certified that error appears in the above-identified patent and that said Letters Patent is hereby corrected as shown below:

In the Claims

Column 11
Line 26, Claim 3, "sided" should be --side--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*